United States Patent [19]

Logemann

[11] Patent Number: 4,661,991

[45] Date of Patent: Apr. 28, 1987

[54] CIRCUIT ARRANGEMENT FOR PREVENTING UNAUTHORIZED ACCESS TO A COMMUNICATION SYSTEM WHICH IS PROTECTED BY A SUBSCRIBER-SPECIFIC PASSWORD

[75] Inventor: Helmut Logemann, Darmstadt, Fed. Rep. of Germany

[73] Assignee: U.S. Philips Corporation, New York, N.Y.

[21] Appl. No.: 709,015

[22] Filed: Mar. 7, 1985

[30] Foreign Application Priority Data

Mar. 10, 1984 [DE] Fed. Rep. of Germany ....... 3408904

[51] Int. Cl.⁴ ................................................ H04B 1/00

[52] U.S. Cl. .................................. 455/26.1; 455/58; 340/825.31; 340/825.34; 340/825.5

[58] Field of Search ............................ 455/26, 27, 58; 340/825.31, 825.34, 825.50, 825.56; 375/2.1; 179/2 EA, 6.3 CC, 18 DA, 90 D

[56] References Cited

U.S. PATENT DOCUMENTS

| | | | |
|---|---|---|---|
| 4,099,033 | 7/1978 | Murray | 179/18 DA |
| 4,246,573 | 1/1981 | Kiss | 455/26 |
| 4,394,654 | 7/1983 | Hofmann-Cerfontaine | 340/825.34 |
| 4,436,957 | 3/1984 | Mazza et al. | 179/2 EA |
| 4,463,349 | 7/1984 | Mochida et al. | 340/825.56 |
| 4,477,806 | 10/1984 | Mochida et al. | 340/825.56 |
| 4,492,959 | 1/1985 | Mochida et al. | 340/825.56 |
| 4,532,507 | 7/1985 | Edson et al. | 340/825.31 |

*Primary Examiner*—Benedict V. Safourek
*Assistant Examiner*—Elissa Seidenglanz
*Attorney, Agent, or Firm*—Thomas A. Briody; Jack Oisher; William J. Streeter

[57] ABSTRACT

The circuit arrangement in a communication system which is protected by subscriber-specific passwords having a memory which contains all the possible passwords and a comparator which compares each received password with the memory content. A monostable delay circuit with a subsequent logic combining gate, are connected to the output of the comparator (2) via an input gate (5). The monostable delay circuit and the logic combining gate are such that in the presence of an energizing signal applied to a special input (C), when there is non-agreement between the received and the stored passwords the monostable delay circuit starts and during operation inhibits the logic combining gate, while when there is agreement the logic output gate (6) is enabled. Such a circuit arrangement can be provided before each selector stage of a switching system of before each accessible channel of a mobile radio system.

2 Claims, 1 Drawing Figure

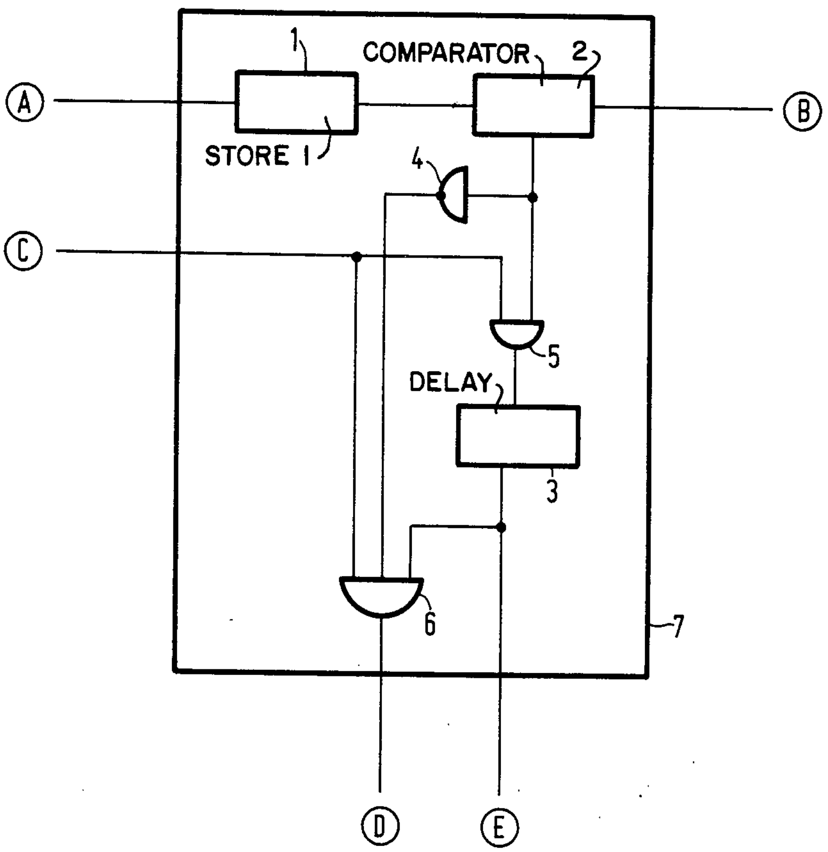
1
COMPARATOR
2
A
B
STORE 1
4
C
5
DELAY
3
6
7
D
E

CIRCUIT ARRANGEMENT FOR PREVENTING UNAUTHORIZED ACCESS TO A COMMUNICATION SYSTEM WHICH IS PROTECTED BY A SUBSCRIBER-SPECIFIC PASSWORD

BACKGROUND OF THE INVENTION

The invention relates to a circuit arrangement for preventing unauthorized access to a communication system which is protected by a subscriber-specific password. Such passwords are assigned as proof of identity of a person authorized to access a communication system which is protected from unauthorized access to the authorized person in addition to a general indentification. These passwords must only be known to the authorized person and to the place where the decision about the access is taken. Before access is given it is checked whether there is indeed agreement between the assigned identification and the password.

As a rule all the assigned secret passwords of all the authorized persons are stored in a data bank of the place(s) where the decision about the access is taken. After an identification has been received, the deciding place waits for a password which agrees with the assigned password checked in its data bank. When there is agreement between the passwords the person requesting access is indeed authorized and indentified as such.

Whether such a system is protected from unauthorized use depends fundamentally on the extent to which the content of the password memory can be protected from unauthorized reading or changes. The risk that a data bank is read by unauthorized persons has significantly increased because of the enormously increased use of home computers and a corresponding wider knowledge in a vast number of subscribers. Successful efforts by computer-aided systematic or random trials to find a secret password are ever increasing.

In this situation the measure according to the invention becomes operative. The invention has for its object to counteract by appropriate circuit measures a potential manupulator who tries to obtain in a fraudulent way access to protected information, for example in a data bank, a mobile radio network, a converter network, using a series of guessed passwords.

This object is accomplished by the circuit arrangement described herein.

Because of the progress in modern semiconductor storage techniques, the overall circuit arrangement requires only very little space. The circuit arrangement is frequently provided in a further embodiment of the invention before each selector stage of a switching system or before each accessible channel of a mobile radio system. Consequently, the intended blocking of a system is within narrow limits.

To increase the protection, all the elements of the circuit arrangement are provided unaccessibly on a support and surrounded by an unaccessable envelope. Direct material access to the store results in the destruction of the storage arrangement. Electrical access extends, when there is no agreement between the passwords applied to the arrangement, the access time for the next scanning operation of the stored data by a factor of $1\times10^8$. Theoretically, a 16-bit password may require up to $2^{16}$, i.e. 65.536 access trials with extended access time, to obtain one single access.

In the above example the blocking period after non-agreement would amount to $1\times10^8$ multiplied by a 500 ns storage (control) access times i.e. 50 s. For 65.536 possible trials this would mean a time equal to 65.536 times 50 s, i.e. 910 hours or 38 days for obtaining one single successful access. An average period of 10 to 14 days may be assumed to be a realistic time required for getting successful access once.

BRIEF DESCRIPTION OF THE DRAWING

The FIGURE is a block diagram of a circuit for comparison of entered passwords with stored subscriber passwords in a communication system.

DESCRIPTION OF THE PREFERRED EMBODIMENT

The accompanying FIGURE shows how the invention operates. The secret password assigned to the general indentification components (storage addresses) are stored in store 1 at the input A. The comparator 2 checks whether there is agreement between an external password present at input B and the secret passport assigned from the store after the general identification component is presented at input A. When there is agreement, the comparator 2 applies the logic level low to the subsequent gate 5 and to the NOT-gate 4. If there is no agreement, the comparator 2 supplies the logic level high. These functions have preparatory influence on the monostable delay circuit 3 and in combination with this circuit on the logic combining gate 6. In the rest condition, the monostable delay circuit 3 applies the logic level high to the output E and preparatorily to the logic combination gate 6. The output D carries the logic level low (negative result). The arrangement is energized by applying the logic level high to the input C.

The following situations are possible:

The arrangement is in the resting condition and the comparator 2 finds agreement. During the period of time the logic level high is present at the input C the output D has the logic level high (positive result). The monostable delay circuit 3 remains in the resting condition, consequently its output E carries the logic level high (normal access).

The arrangement is in the resting condition and the comparator 2 finds non-agreement (error). The monostable delay circuit 3 is energized by applying the logic level high to the input C via the gate 5. The output E assumes the logic level low and preserves it until the end of operation of the delay circuit 3 (delayed access). As long as the logic level high is present on the input C, the output D remains in the resting condition, that is to say at the logic level low (negative result).

The arrangement is in the "monostable delay circuit operative" state and the comparator 2 finds agreement. A logic level high at the input C does not influence the negative result low at the output D. The output E carries the logic level low (delayed access).

The arrangement is in the "monostable delay circuit operative" state and the comparator 2 finds non-agreement. A logic level high at the input C has no effect on the negative result low at the output D and possibly resets the monostable delay circuit to its starting position (post-triggering). The output E carried the logic level low (delayed access).

The arrangement according to the invention ensures protection from the possibility the secret passwords assigned to subscribers are empirically obtained, by complicating the electric access by extending the access time in the event of discrepancies.

The entire arrangement is provided unaccessibly on a support 7 and enclosed by an undetachable envelope. The arrangement is destroyed when it is mechanically tampered with. Consequently, the invention also provides protection against direct access to the memory 1.

What is claimed is:

1. A circuit arrangement for impeding unauthorized access to a communication system which is protected by a subscriber-specific password, said system having a memory containing all possible passwords, and a comparator for comparing each entered password with passwords stored in said memory, said comparator allowing a calling subscriber access to a line after an access time interval when there is agreement between an entered and a stored password, said circuit arrangement including:

a monostable delay circuit (3) with a subsequent logic combining gate (6), said delay circuit connected to the output of said comparator (2) via an input gate (5) and said delay circuit and said logic combining gate (6) being connected such that when an energizing signal is present at a special input (C) and there is no agreement between an entered password and a stored password, said monostable delay circuit (3) becomes operative to inhibit said logic combining gate (6) for an extended time period which is at least an order of magnitude greater than said access time interval, not withstanding that during such extended time period a password is entered which agrees with a stored password; while when said monostable delay circuit is not operative and there is agreement between an entered and a stored password said logic combining gate (6) is enabled.

2. A circuit arrangement as claimed in claim 1, characterized in that an operating condition "monostable delay circuit operative" can be recognized at a special output (E).

* * * * *